(12) United States Patent
Yang et al.

(10) Patent No.: US 7,325,958 B2
(45) Date of Patent: Feb. 5, 2008

(54) LIGHT GUIDING PLATE AND BACKLIGHT MODULE EMPLOYING THE SAME

(75) Inventors: Xing-Peng Yang, Beijing (CN); Ying-Bai Yan, Beijing (CN); Guo-Fan Jin, Beijing (CN)

(73) Assignees: Tsing Hua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,785

(22) Filed: Sep. 26, 2006

(65) Prior Publication Data

US 2007/0159848 A1    Jul. 12, 2007

(30) Foreign Application Priority Data

Jan. 6, 2006    (CN) .......................... 2006 1 0032817

(51) Int. Cl.
*F21V 7/04* (2006.01)
(52) U.S. Cl. ........................ 362/621; 362/619; 362/625
(58) Field of Classification Search ................ 362/600, 362/606, 608, 609, 612, 615, 617, 619, 621, 362/624, 625; 349/65
See application file for complete search history.

(56) References Cited

U.S. PATENT DOCUMENTS

| 7,160,016 | B2 * | 1/2007 | Yu et al. ..................... 362/617 |
| 2003/0067436 | A1 | 4/2003 | Awamoto et al. |
| 2006/0203511 | A1 * | 9/2006 | Tseng .......................... 362/608 |
| 2006/0232998 | A1 * | 10/2006 | Tsai et al. .................... 362/621 |
| 2007/0139968 | A1 * | 6/2007 | Chang .......................... 362/621 |

* cited by examiner

*Primary Examiner*—Y. My Quach-Lee
(74) *Attorney, Agent, or Firm*—Jeffrey T. Knapp

(57) ABSTRACT

A light guiding plate (120) includes a light incident surface (121), a light emitting surface (122) adjacent to the light incident surface, and a bottom surface (123) opposite to the light emitting surface. The light incident surface includes at least one row of first grooves (1211) and at least one row of second grooves (1212). The first grooves is configured for increasing a range of incident angles in which light beams enter the light guiding plate via the light incident surface and thereby improving a brightness of the light guiding plate, and the second grooves is configured for complementing the functions of the first grooves thereby improving a uniformity of light output by the light guiding plate.

14 Claims, 6 Drawing Sheets

LIGHT GUIDING PLATE AND BACKLIGHT MODULE EMPLOYING THE SAME

FIELD OF THE INVENTION

The present invention relates to light guiding plates and, more particularly, to a light guiding plate with high uniformity of output light and a backlight module employing the light guiding plate.

DESCRIPTION OF RELATED ART

Nowadays, liquid crystal displays which have different sizes are in widespread use for different applications, such as TVs, liquid crystal projectors, mobile telephones, personal digital assistants (PDAs), etc. Because the liquid crystal of a liquid crystal display cannot itself emit light, a light source must be utilized to illuminate the liquid crystal to enable images to be displayed. The light source may be ambient light or a light source device provided with the liquid crystal display. The light source device is commonly called a backlight source, since it is usually configured behind a liquid crystal panel of the liquid crystal display. A combination of all components behind the liquid crystal panel, including the light source device, is generally referred to as a backlight module. Generally, backlight modules can be classified into edge type backlight modules and direct type backlight modules. In an edge type backlight module, the light source is positioned adjacent to a thin edge of a light guiding plate. In a direct type backlight module, the light source is positioned behind a light guiding plate.

Typically, cold cathode fluorescent lamps (CCFLs) and light emitting diodes (LEDs) are employed as light sources in backlight modules. However, backlight devices employing cold cathode fluorescent lamps have the disadvantages of high energy consumption, low uniformity of brightness, poor purity of white light, and high cost. In addition, after being used for a period of time, the brightness of a CCFL tends to become degraded, and the color of the light output is apt to shift. Accordingly, CCFL light sources generally cannot satisfy the high quality requirements of certain high-end liquid crystal displays.

Compared to CCFL light sources, light emitting diodes (LEDs) have many advantages, such as high brightness, low energy consumption, long service life, and so on. In particular, high power LEDs are considered more suitable for certain high-end liquid crystal displays.

Referring to FIGS. 5 and 6, a conventional edge type backlight module 10 includes a number of LEDs 30 used as light sources and a light guiding plate 20 adjacent to the light sources 30. The light guiding plate 20 includes a light incident surface 22 adjacent to the light sources 30, a light emitting surface 21 adjoining the light incident surface 22, and a bottom surface 25 opposite to the light emitting surface 21. The light incident surface 22 receives light beams emitted from the light sources 30. The light beams subsequently exit from the light guiding plate 20 via light emitting surface 21. However, each of the LEDs 30 generally has a limited range of light emission angles. As a result, a number of dark regions 23 are formed in areas of the light guiding plate 20 generally between every two adjacent LEDs 30, and a number of bright regions 24 are formed in areas of the light guiding plate 20 corresponding to each the LEDs 30. That is, the edge type backlight module 10 has non-uniform brightness.

What is needed, therefore, is a light guiding plate with high brightness and uniformity of output light, and a backlight module employing the light guiding plate.

SUMMARY OF THE INVENTION

A light guiding plate according to a preferred embodiment includes an light incident surface, a light emitting surface adjacent to the light incident surface, and a bottom surface opposite to the light emitting surface. The light incident surface includes at least one row of first grooves and at least one row of second grooves, the first grooves being configured for increasing a range of incident angles in which light beams enter the light guiding plate via the light incident surface and thereby improving a brightness of the light guiding plate, and the second grooves being configured for complementing the functions of the first grooves thereby improving a uniformity of light output by the light guiding plate.

A backlight module according to another preferred embodiment includes at least one light source, and a light guiding plate. The light guiding plate includes a light incident surface, a light emitting surface adjacent to the light incident surface, and a bottom surface opposite to the light emitting surface. The light incident surface being located corresponding to the at least one light source and includes at least one row of first grooves and at least one row of second grooves, the first grooves being configured for increasing a range of incident angles in which light beams emitted from the at least one light source enter the light guiding plate via the light incident surface and thereby improving a brightness of the light guiding plate, and the second grooves being configured for complementing the functions of the first grooves thereby improving a uniformity of light output by the light guiding plate.

Each of the above-described light guiding plates uses the first V-shaped grooves to increase the range of incident angles in which light beams enter the light guiding plate via the light incident surface and improve the brightness of the light guiding plate, and uses the second V-shaped grooves to complement the first V-shaped grooves for making output lights more uniform. Therefore, the light guiding plate has a high brightness and a high uniformity of output lights. The corresponding backlight module also has a high brightness and a high uniformity of output lights.

Other advantages and novel features will become more apparent from the following detailed description of the present light guiding plate and backlight module, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present light guiding plate and backlight module. Moreover, in the drawings, like reference numerals designate corresponding parts throughout the several views.

DETAILED DESCRIPTION OF THE INVENTION

Reference will now be made to the drawings to describe preferred embodiments of the present light guiding plate and backlight module, in detail.

Figure 1:
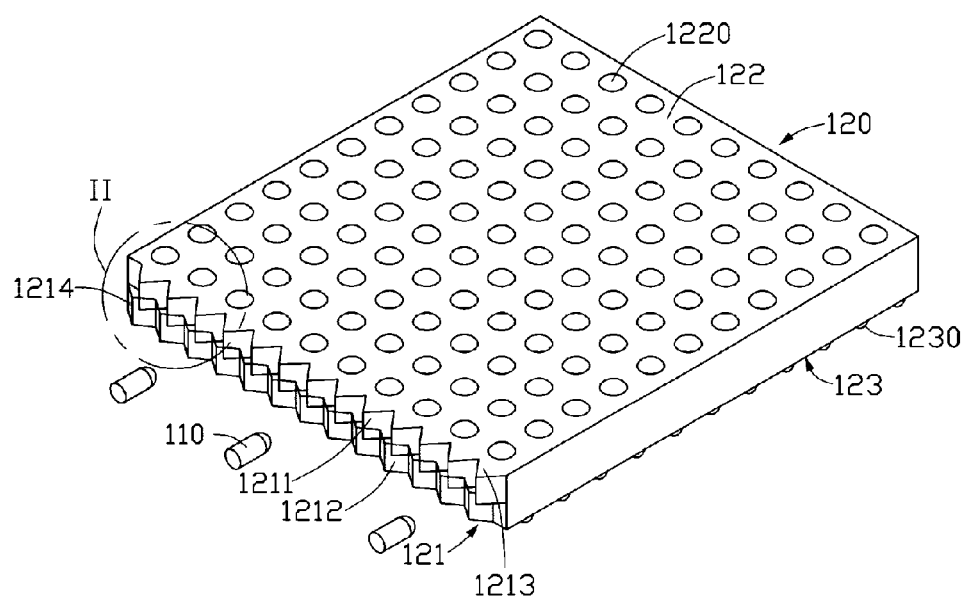
FIG. 1 is an isometric view of a backlight module in accordance with a first preferred embodiment of the present invention.
Figure 2:
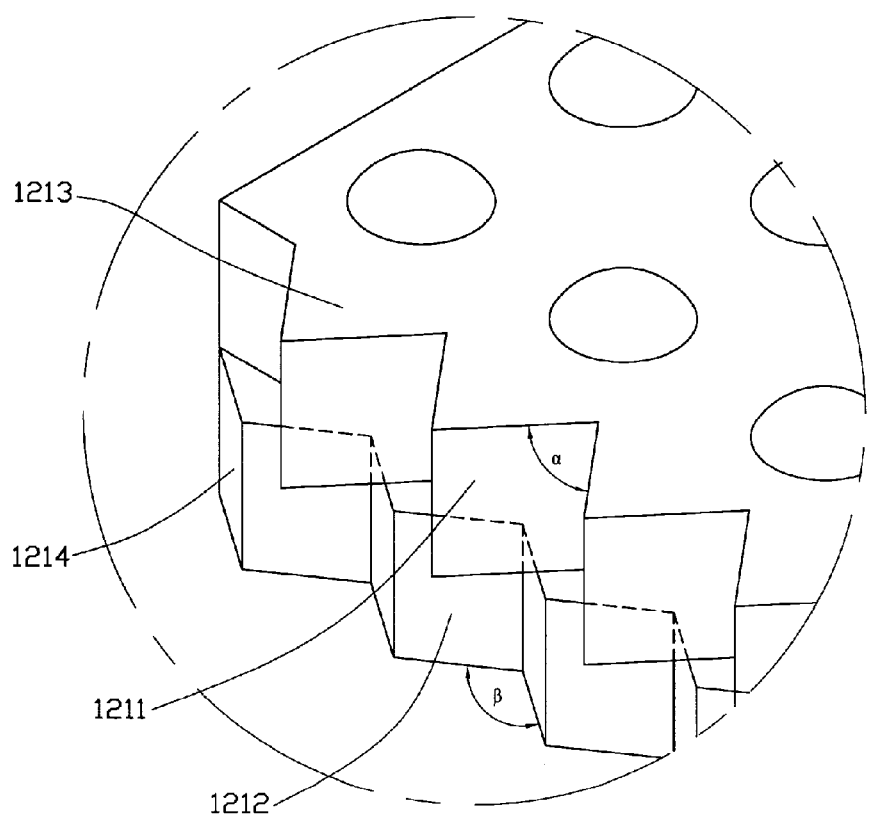
FIG. 2 is an enlarged view of a circled region II of FIG. 1.

Referring to FIGS. 1 and 2, a backlight module 100 in accordance with a first preferred embodiment of the present invention includes at least one light source 110, and a light guiding plate 120. In this exemplary embodiment, there are three light sources 110. The light guiding plate 120 includes a light incident surface 121 corresponding to the light sources 110, a light emitting surface 122 adjoining the incident surface 121, and a bottom surface 123 opposite to the light emitting surface 122. In this exemplary embodiment, LEDs are used as the light sources 110.

A row of first grooves 1211 is defined in an upper half of the light incident surface 121 of the light guiding plate 120, and a row of second grooves 1212 is defined in a lower half of the light incident surface 121 of the light guiding plate 120. The first and second grooves 1211, 1212 can be V-shaped grooves, U-shaped grooves, arc-shaped grooves, etc. Preferably, the first and second grooves 1211, 1212 are V-shaped grooves.

The first V-shaped grooves 1211 are defined by a row of continuous first V-shaped prisms 1213 formed along the upper half of the light incident surface 121. Each of the first V-shaped prisms 1213 has two flat, oblique surfaces. The adjacent oblique surfaces of each two adjacent V-shaped prisms 1213 define a respective one of the first V-shaped grooves 1211, and a corresponding first vertex angle α therebetween.

The second V-shaped grooves 1212 are defined by a row of continuous second V-shaped prisms 1214 formed along the lower half of the light incident surface 121. Each of the second V-shaped prisms 1214 has two flat, oblique surfaces. The adjacent oblique surfaces of each two adjacent second V-shaped prisms 1214 define a respective one of the second V-shaped grooves 1212, and a corresponding second vertex angle β therebetween. The second vertex angle β is different from the vertex angle α.

Each first V-shaped prism 1213 is aligned along a vertical direction, such that the first V-shaped prisms 1213 are parallel to each other. Each second V-shaped prism 1214 is aligned along the vertical direction, such that the second V-shaped prisms 1214 are parallel to each other. Accordingly, each of the first V-shaped grooves 1211 is aligned along the vertical direction, and each of the second V-shaped grooves 1212 is aligned along the vertical direction. That is, the first V-shaped grooves 1211 are parallel to the second V-shaped grooves 1212. However, the row of first V-shaped grooves 1211 is offset relative to the row of second V-shaped grooves 1212, such that each first V-shaped groove 1211 is located generally above a respective second V-shaped prism 1214, and each second V-shaped groove 1212 is located generally below a respective first V-shaped prism 1213.

In this exemplary embodiment, since the first V-shaped prisms 1213 are arranged in a row and are continuous, the first V-shaped grooves 1211 are arranged in the same row and are continuous. Furthermore, each first vertex angle α is typically in the range from 60 to 100 degrees. Preferably, each first vertex angle α is 80 degrees.

In this exemplary embodiment, since the second V-shaped prisms 1214 are arranged in a row and are continuous, the second V-shaped grooves 1212 are arranged in the same row and are continuous. Furthermore, each second vertex angle β is typically in the range from 100 to 140 degrees. Preferably, each second vertex angle β is 120 degrees.

The first V-shaped grooves 1211 is used for increasing the range of incident angles in which light beams enter the light guiding plate 120 via the light incident surface 121 and improving the brightness of the light emitting surface 122 of the light guiding plate 120. The second V-shaped grooves 1212 provide similar functions and advantages. That is, the second V-shaped grooves 1212 are used for complementing the functions and advantages of the first V-shaped grooves 1211, whereby light output from the light emitting surface 122 is more uniform.

Preferably, in this exemplary embodiment, a thickness of the light guiding plate 120 is 0.8 mm, and the light guiding plate 120 is made of polymethyl methacrylate (PMMA) having a refractive index of 1.49. The first and second V-shaped prisms 1213, 1214 each have a length of 0.4 mm, and a width of 0.1 mm. Furthermore, the light guiding plate 120 preferably includes a number of micro-dots 1230 formed on the bottom surface 123, for improving a reflection capability of the bottom surface 123. The light guiding plate 120 also preferably includes a number of micro-dots 1220 formed on the light emitting surface 122, for further improving the brightness of the light guiding plate 120. In this exemplary embodiment, the micro-dots 1230, 1220 are in the form of protrusions. In alternative embodiments, the micro-dots 1230, 1220 can be in the form of depressions.

Unlike in a conventional backlight module, the present backlight module 100 uses the first V-shaped grooves 1211 to increase the range of incident angles in which light beams enter the light guiding plate 120 via the light incident surface 121 and improve the brightness of the light guiding plate 120, and uses the second V-shaped grooves 1212 to complement the functions and advantages of the first V-shaped grooves 1211 and thereby make the light output by the light guiding plate 120 more uniform. That is, the light guiding plate 120 has high brightness and high uniformity of output light. The backlight module 100 correspondingly has high brightness and high uniformity of output light.

Figure 3:
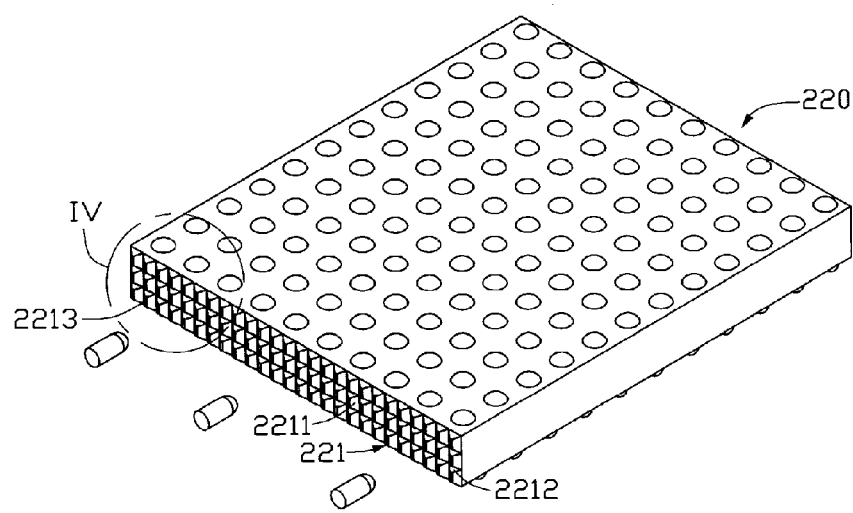
FIG. 3 is an isometric view of a backlight module in accordance with a second preferred embodiment of the present invention.
Figure 4:
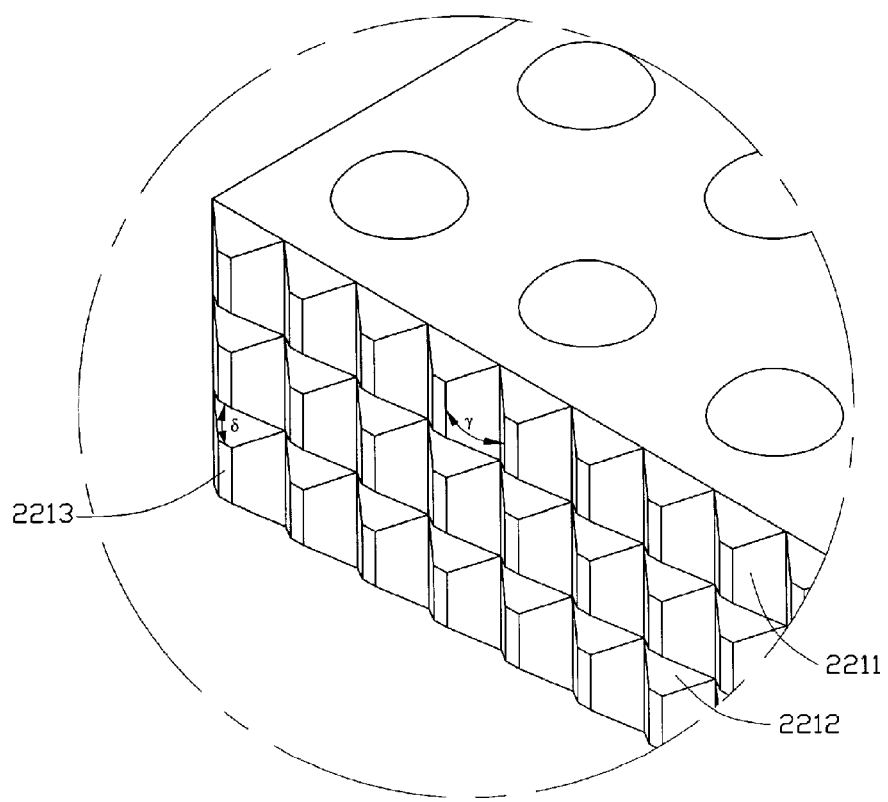
FIG. 4 is an enlarged view of a circled region IV of FIG. 3.
Figure 5:
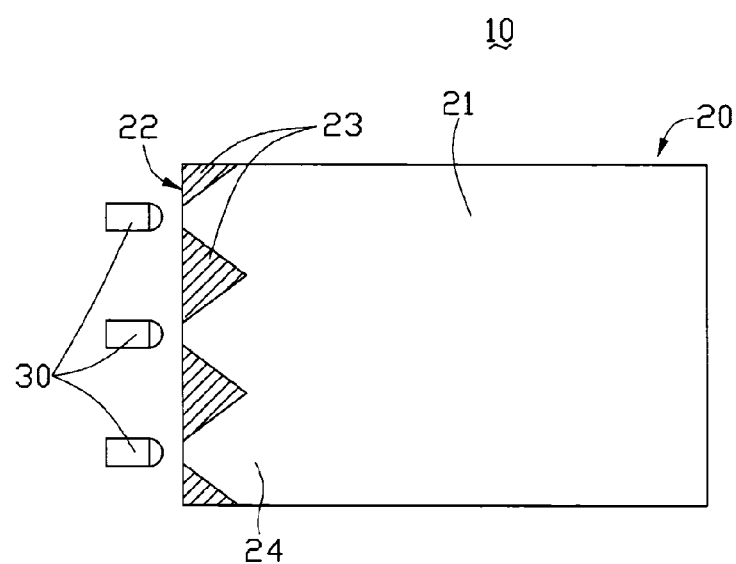
FIG. 5 is a top plan view of a conventional backlight module.
Figure 6:
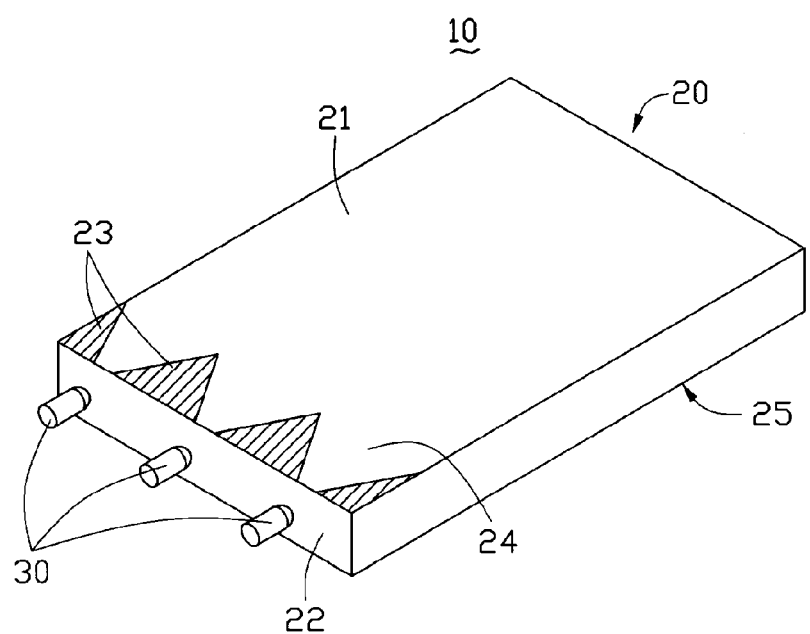
FIG. 6 is an isometric view of the backlight module of FIG. 5.

Referring to FIGS. 3 and 4, a backlight module 200 in accordance with a second preferred embodiment is shown. The backlight module 200 is similar to the backlight module 100 of the first embodiment. However, in the backlight module 200, except that at least one row of parallel first V-shaped grooves 2211 is defined in a light incident surface 121 of a light guiding plate 220, and at least one row of aligned second V-shaped grooves 2212 is defined in the light incident surface 121 of the light guiding plate 220. In this exemplary embodiment, there are three rows of first V-shaped grooves 2211, and two rows of second V-shaped grooves 2212. Each of the first V-shaped grooves 2211 is aligned along a vertical direction. Further, each first V-shaped groove 2211 in any of the rows of first V-shaped grooves 2211 is aligned with a corresponding first V-shaped groove 2211 in each of the other rows of first V-shaped grooves 2211. Each of the second V-shaped grooves 2212 is aligned along a horizontal direction. That is, the first V-shaped grooves 2211 are perpendicular to the second V-shaped grooves 2212.

The first V-shaped grooves 2211 and the second V-shaped grooves 2212 are defined by a number of generally trapezoidal prisms 2213 arranged in at least two rows. In this exemplary embodiment, the trapezoidal prisms 2213 are arranged in three rows. Each of the trapezoidal prisms 2213 includes four flat, oblique surfaces that adjoin one another and slope toward each other from a base of the trapezoidal prism 2213, and a flat end surface adjoining all four flat, oblique surfaces. The flat end surface is aligned in a vertical plane. The adjacent oblique surfaces of each two adjacent trapezoidal prisms 2213 arranged in a same row define a respective one of the first V-shaped grooves 2211, and a corresponding vertex angle γ therebetween. The adjacent oblique surfaces of each two adjacent trapezoidal prisms 2213 arranged one above the other define a respective one of the second V-shaped grooves 2212, and a corresponding vertex angle δ therebetween.

The first vertex angle γ is different from the second vertex angle δ. Each first vertex angle γ is typically in the range from 60 to 120 degrees, and each second vertex angle δ is typically in the range from 30 to 70 degrees. Preferably, the first vertex angle γ is 100 degrees, and the second vertex angle δ is 50 degrees.

The first V-shaped grooves 2211 are used to increase the range of incident angles in which light beams enter the light guiding plate 220 via the light incident surface 221 and improve the brightness of the light guiding plate 220. The second V-shaped grooves 2212 are used to complement the functions and advantages of the first V-shaped grooves 2211 and thereby make the light output by the light guiding plate 220 more uniform. That is, the light guiding plate 220 has high brightness and high uniformity of output light. The backlight module 200 correspondingly has high brightness and high uniformity of output light.

In summary, the light guiding plate 120, 220 in accordance with the first or second embodiment can efficiently increase the brightness and the uniformity of light that it outputs. This makes the light guiding plate 120, 220 advantageous for use in the backlight modules 100, 200, other kinds of backlight modules, liquid crystal displays, etc.

It is to be understood that the above-described embodiments are intended to illustrate rather than limit the invention. Variations may be made to the embodiments without departing from the spirit of the invention as claimed. The above-described embodiments are intended to illustrate aspects of the invention but not restrict the scope of the invention.

What is claimed is:

1. A light guiding plate, comprising:
a light incident surface;
a light emitting surface adjacent to the light incident surface; and
a bottom surface opposite to the light emitting surface, the light incident surface comprising at least one row of first grooves and at least one row of second grooves, the first grooves being configured for increasing a range of incident angles in which light beams enter the light guiding plate via the light incident surface and thereby improving a brightness of the light guiding plate, and the second grooves being configured for complementing the function of the first grooves thereby improving a uniformity of light output by the light guiding plate, wherein each first groove has a first vertex angle and each second groove has a second vertex angle, and the first vertex angle is different from the second vertex angle.

2. The light guiding plate as claimed in claim 1, wherein the first grooves are parallel to the second grooves.

3. The light guiding plate as claimed in claim 2, wherein the first vertex angle is in the range from 60 to 100 degrees, and the second vertex angle is in a range from 100 to 140 degrees.

4. The light guiding plate as claimed in claim 1, wherein the first grooves are perpendicular to the second grooves.

5. The light guiding plate as claimed in claim 4, wherein the first vertex angle is in the range from 60 to 120 degrees, and the second vertex angle is in the range from 30 to 70 degrees.

6. The light guiding plate as claimed in claim 1, wherein the first grooves and the second grooves are V-shaped grooves.

7. The light guiding plate as claimed in claim 1, further comprising a plurality of micro-dots formed at the bottom surface and configured for enhancing a reflection capability of the light guiding plate.

8. The light guiding plate as claimed in claim 1, further comprising a plurality of micro-dots formed on the light emitting surface and configured for further improving the brightness of the light guiding plate.

9. A backlight module, comprising:
at least one light source; and
a light guiding plate, the light guiding plate comprising a light incident surface, a light emitting surface adjacent to the light incident surface, and a bottom surface opposite to the light emitting surface, the light incident surface being located corresponding to the at least one light source and comprising at least one row of first grooves and at least one row of second grooves, the first grooves being configured for increasing a range of incident angles in which light beams emitted from the at least one light source enter the light guiding plate via the light incident surface and thereby improving a brightness of the light guiding plate, and the second grooves being configured for complementing the functions of the first grooves thereby improving a uniformity of light output by the guiding plate, wherein each first groove has a first vertex angle and each second groove has a second vertex angle, and the first vertex angle is different from the second vertex angle.

10. The backlight module as claimed in claim 9, wherein the first grooves are parallel to the second grooves.

11. The backlight module as claimed in claim 10, wherein the first vertex angle is in the range from 60 to 100 degrees and the second vertex angle is in a range from 100 to 140 degrees.

12. The backlight module as claimed in claim 9, wherein the first grooves are perpendicular to the second grooves.

13. The backlight module as claimed in claim 12, wherein the first vertex angle is in the range from 60 to 120 degrees and the second vertex angle is in the range from 30 to 70 degrees.

14. The backlight module as claimed in claim 9, wherein the first type grooves and the second type grooves are V-shaped grooves.

* * * * *